Dec. 27, 1949     W. HEIM, JR     2,492,284
SAFETY TRIP MECHANISM FOR PUNCH
PRESSES AND THE LIKE
Filed Jan. 10, 1947     4 Sheets-Sheet 4
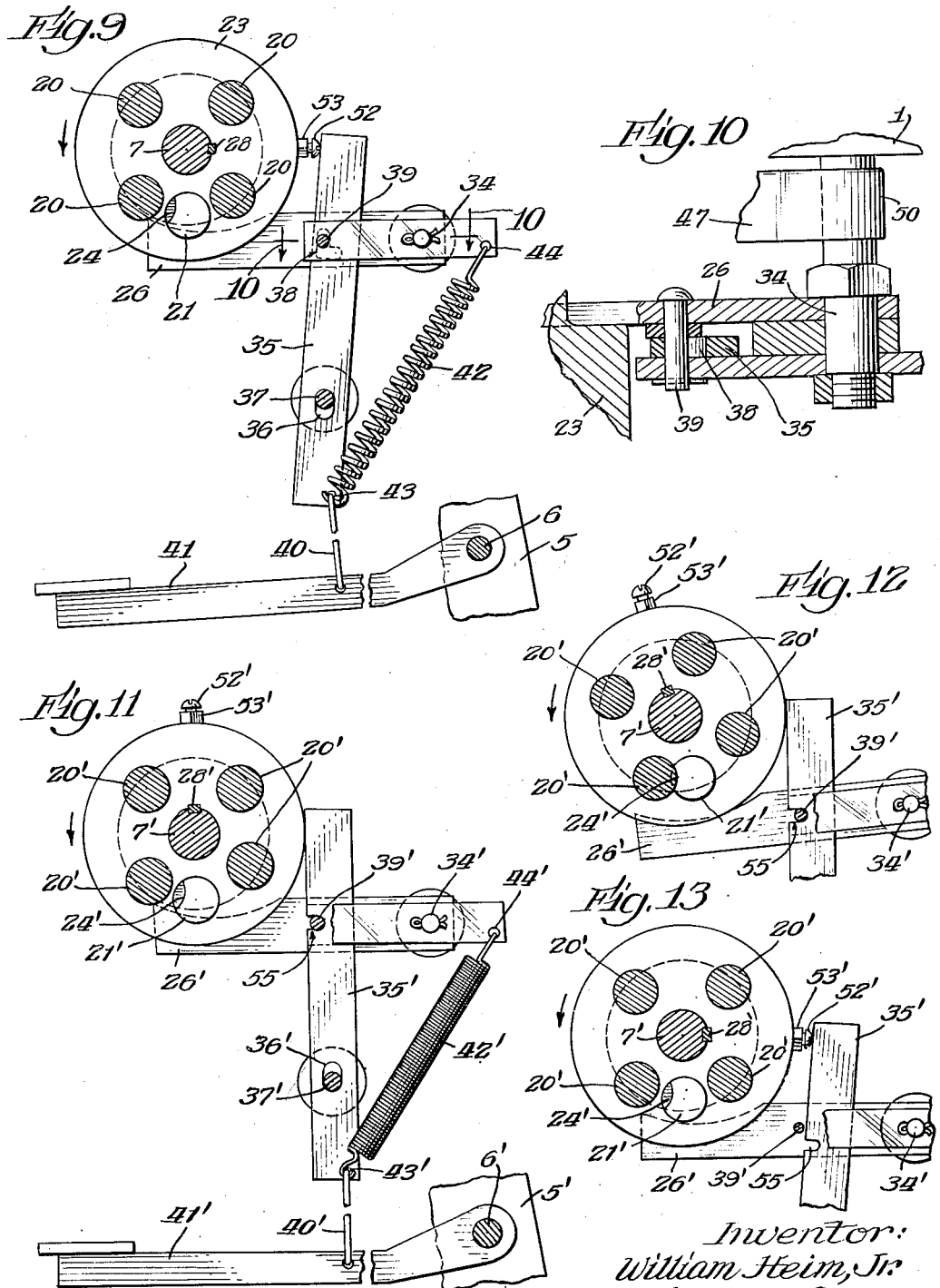
Inventor:
William Heim, Jr.

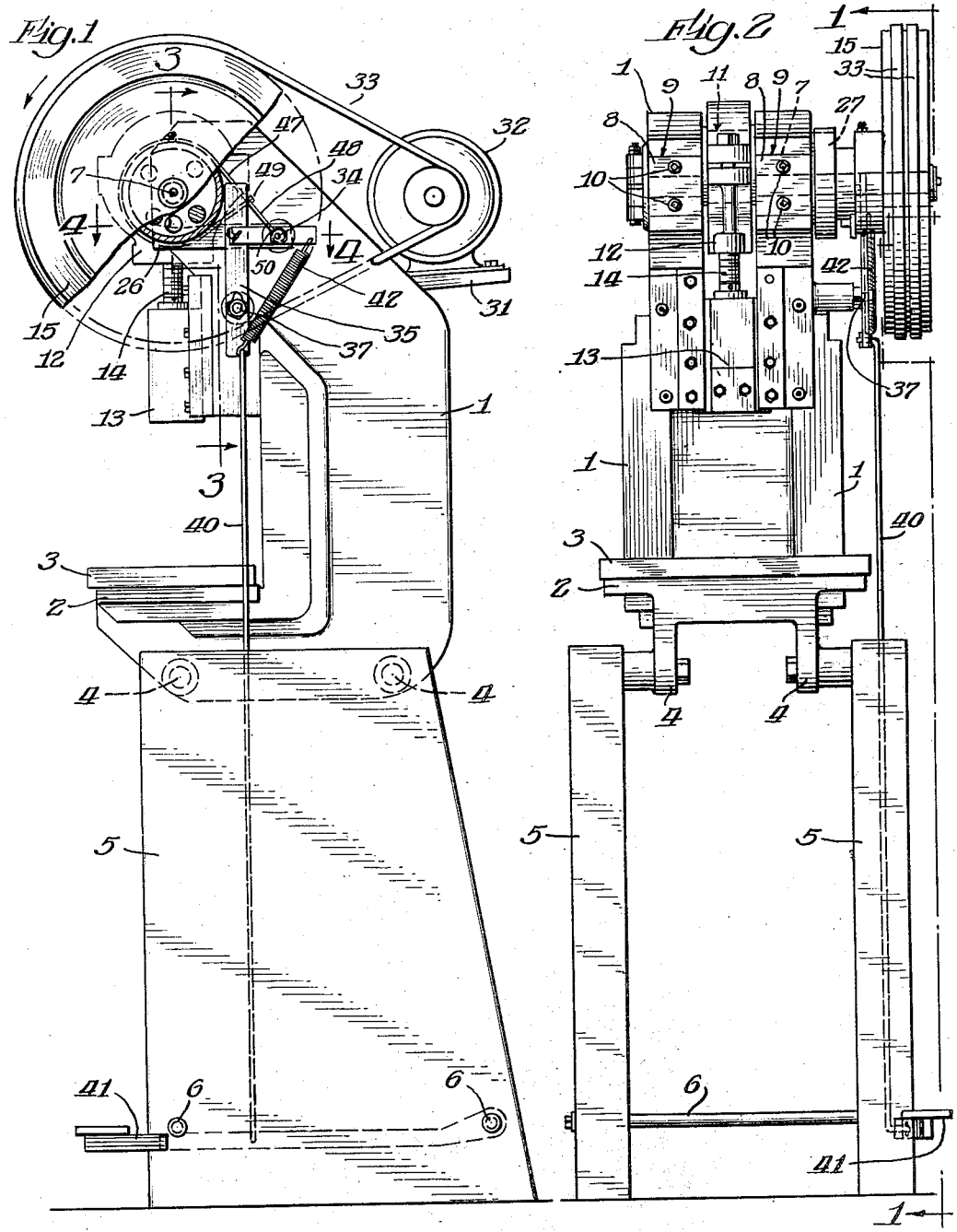

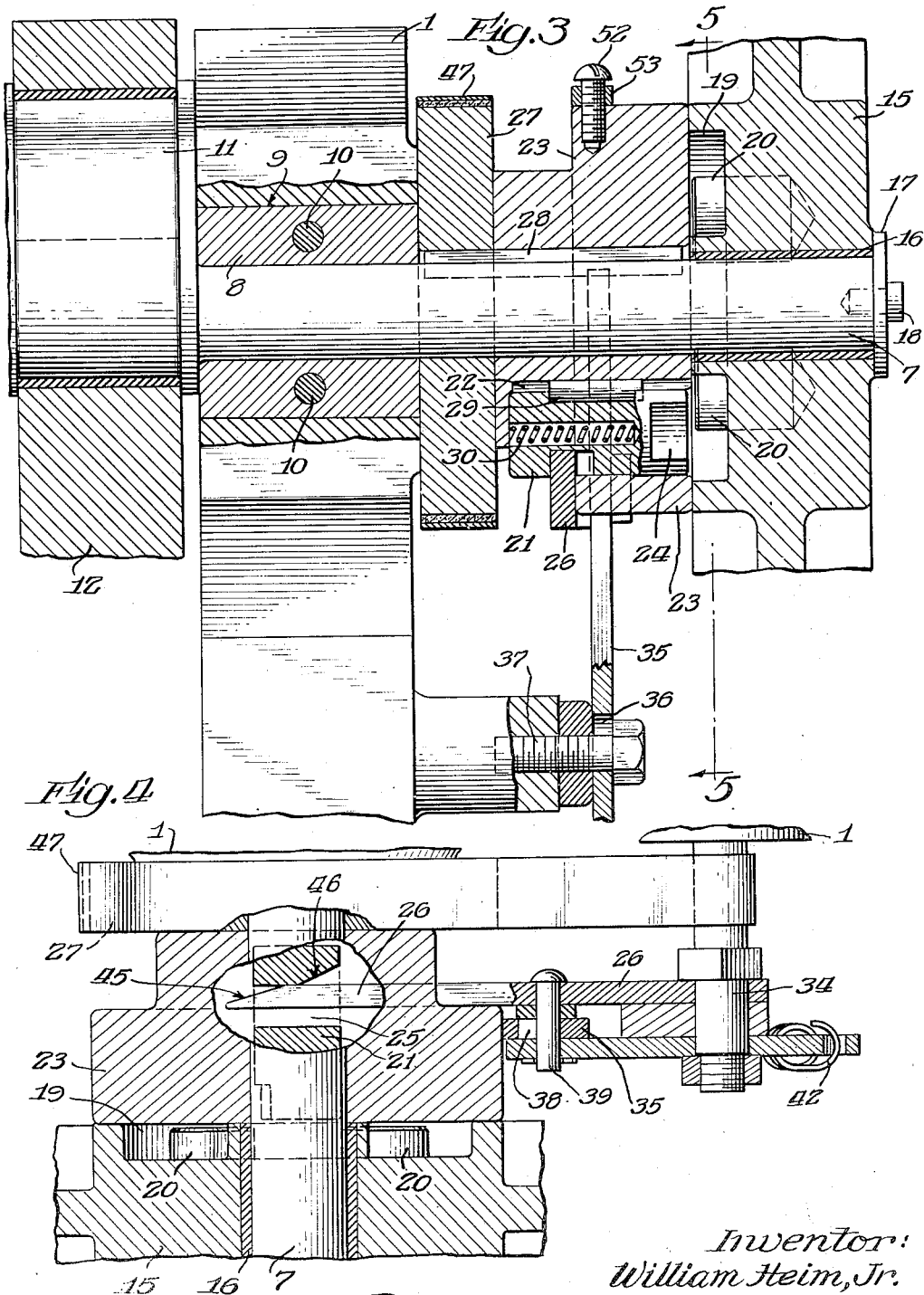

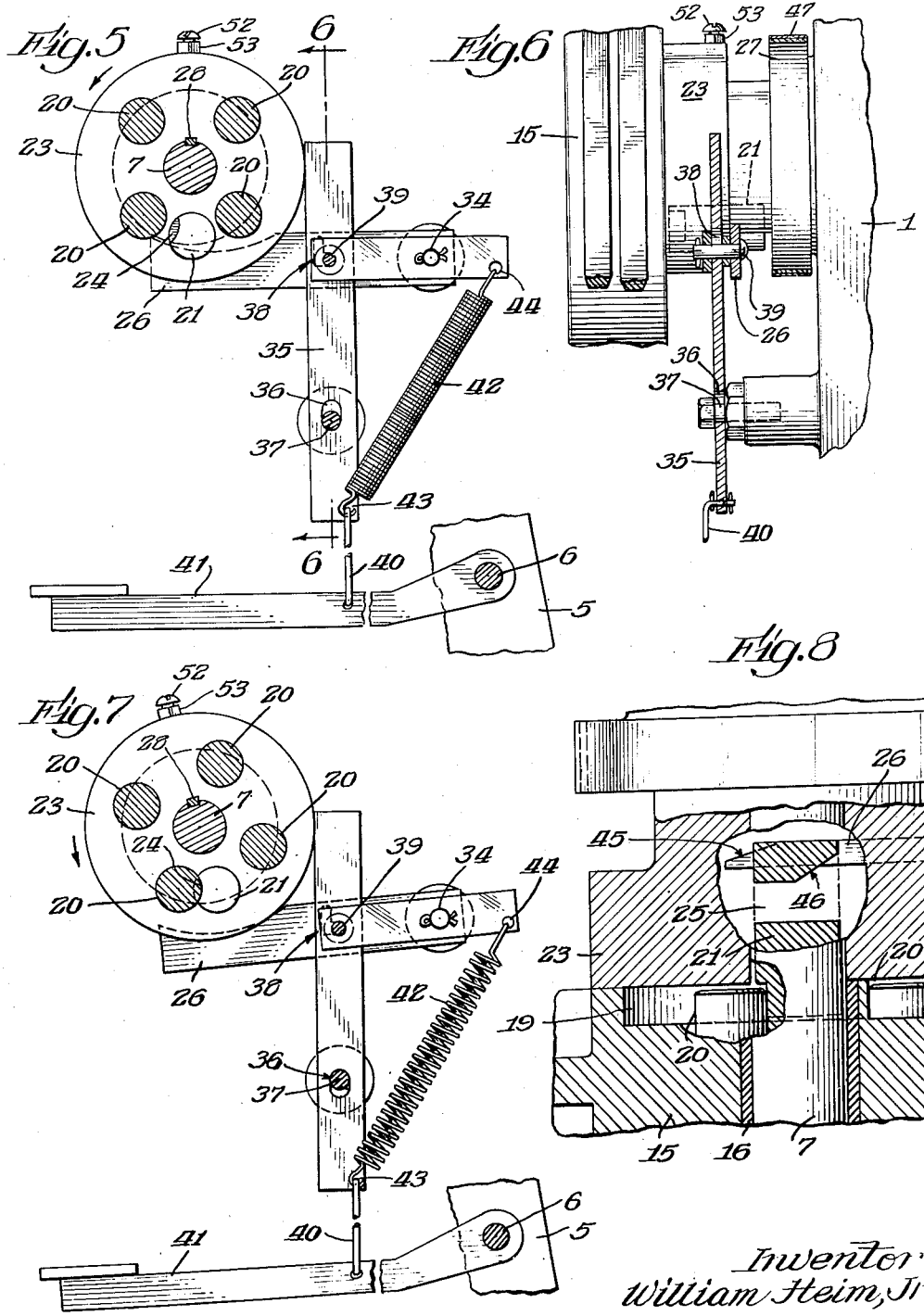

Patented Dec. 27, 1949

2,492,284

UNITED STATES PATENT OFFICE 2,492,284

SAFETY TRIP MECHANISM FOR PUNCH PRESSES AND THE LIKE

William Heim, Jr., Chicago, Ill.

Application January 10, 1947, Serial No. 721,403

8 Claims. (Cl. 192—12)

This invention relates, in general, to punch presses, and has particular relation to an improved safety trip mechanism therefor.

While I have referred to the invention as a safety trip mechanism for punch presses and shall hereinafter, in connection with the drawings, describe the invention in that regard, it is to be understood that the device of the present invention may be employed for all similar purposes, for example, wherever a safety trip mechanism or a one revolution clutch is desired.

Prior devices of the sort with which the present invention is concerned usually embody a continuously rotating power member, such as a flywheel, a rotatable crank shaft, cooperating clutch elements between the power member and the crank shaft adapted to be moved into and out of clutching engagement to cause intermittent rotation of the crank shaft to be produced during continuous rotation of the power member, and a hand or foot lever for controlling engagement of the clutch elements.

Ordinarily in these prior devices, when the operator or attendant depresses the hand or foot lever or pedal to connect the crank shaft for rotation with the power member, the crank shaft will continue to rotate or repeat its rotation until the hand or foot lever is released. As a result, safety is not assured, either as to the work being performed or in respect of the operator or attendant at the machine.

One of the main objects of the present invention is to provide an improved safety trip mechanism which will operate automatically as a safety device to disengage the clutch elements at the end of each cycle of operation of the machine regardless of whether the operator releases or fails to release the hand or foot pedal following its actuation to engage the clutch elements.

Another object of the invention is to provide a device of the class described, having various features of novelty and advantages, and which is particularly characterized by its simplicity in construction, its economy in manufacture, its effectiveness in use, and the ease and assurance with which it operates for the intended purposes.

Another and more particular object of the invention is to provide a device of the class described comprising a clutch releasing member operable to release the clutch elements, a lever connected, for example, to a foot pedal which, upon being depressed, depresses the lever, co-operating means on the lever and the clutch releasing member for moving the clutch releasing member to released position permitting engagement of the clutch elements and for holding the same in such position when the foot pedal is depressed, and a lever tripping member rotatable with the crank shaft and operable at the end of each cycle of operation of the machine to move the lever to position in which the clutch releasing member is automatically freed of the lever and operates to release the clutch elements regardless of whether the operator releases or fails to release the hand or foot pedal.

Another and more particular object of the invention is to provide a device of the class described in which the lever and the clutch releasing member are positioned generally at right angles to each other and in which a spring connected between the lever and the clutch releasing member operates to move the clutch releasing member to clutch releasing position when it is freed from the lever.

Another and more particular object of the invention is to provide a lever tripping member which is adjustable to impart any desired degree of movement to the lever for freeing the clutch releasing member therefrom, and is adapted to be secured firmly in adjusted position.

Further objects and advantages of the invention will appear from the following detailed description, taken in connection with the accompanying drawings which illustrate the manner of constructing and operating certain illustrative embodiments of the present invention.

In the drawings:

Figure 1 is a side elevational view of a punch press embodying the present invention, with the flywheel partially broken away and parts in section, taken substantially on the line 1—1 of Figure 2;

Figure 2 is a front elevational view of the punch press shown in Figure 1;

Figure 3 is a vertical sectional view taken substantially on the line 3—3 of Figure 1;

Figure 4 is a horizontal sectional view taken substantially on the line 4—4 of Figure 1, with the clutch releasing member in position holding the clutch element carried by the crank shaft out of driving relation with the clutch elements carried by the flywheel;

Figure 5 is a fragmentary sectional view taken substantially on the line 5—5 of Figure 3, with the trip mechanism in normal position;

Figure 6 is a view partially in section and partially in elevation taken on the line 6—6 of Figure 5;

Figure 7 is a view similar to Figure 5, with the pedal in depressed position and the clutch releasing member in released position for engagement of the clutch elements;

Figure 8 is a fragmentary sectional view similar to Figure 4, but showing the clutch releasing member in released position and the clutch elements in driving relation;

Figure 9 is a view similar to Figures 5 and 7, showing the operation of the lever tripping member in tripping the lever for disengagement of the clutch elements with the pedal depressed;

Figure 10 is a view partially in section and partially in elevation, taken substantially on the line 10—10 of Figure 9;

Figure 11 is a view similar to Figure 5, showing a modified form of safety trip mechanism;

Figure 12 is a fragmentary view showing the lever of Figure 11 in depressed position and holding the clutch releasing member in released position; and Figure 13 is a fragmentary view similar to Figure 12, showing the operation of the lever tripping member in tripping the lever of Figure 11 for disengagement of the clutch elements with the pedal depressed.

Referring now to the drawings, the punch press selected for illustration comprises a main frame 1 having a bed 2 provided with a bolster plate 3. The lower end of the frame 1 is mounted at 4 between and on the upper ends of the legs 5. The lower ends of the legs 5 are tied together by rods 6.

The crank shaft 7 is journaled in split bearing blocks 8 which, externally, are of square or other polygonal form, and are mounted in recesses 9 of corresponding form in the forward sides of the upper overhanging ends of the sides of the frame 1. The split parts of each bearing block 8 are secured together and in the recesses 9 in the frame 1 by bolts 10.

Between the portions journaled for rotation in the bearing blocks 8 the crank shaft 7 has an eccentric 11 which actuates a pitman 12 to impart reciprocatory movement to the ram or holder 13 which carries the punch or other tool employed by the press. A screw adjustment 14 is preferably provided between the pitman 12 and the ram or tool holder 13.

The rotating power member is in the form of a flywheel 15 loosely mounted on the right hand end of the crank shaft 7 as the machine is viewed in Figures 2 and 3. An annular bushing 16 is preferably interposed between the flywheel 15 and the portion of the crank shaft 7 on which it is loosely mounted. A retaining cap 17, secured to the outer end of the crank shaft 7 by a screw 18, retains the flywheel 15 against displacement from the end of the crank shaft 7.

The inner end of the flywheel 15 is recessed at 19, and a plurality of driving clutch elements, for example, in the form of pins 20 are secured in the flywheel 15 with their outer ends extending into the recess 19. Four driving clutch elements 20, equi-spaced circumferentially about the hub of the flywheel, are shown in the drawings, but this may vary within the scope of the present invention. The driving clutch elements 20 are shown of cylindrical form, but this, too, may vary.

The driven clutch element 21 is shown in the form of a generally cylindrical pin mounted in a recess 22 of corresponding form in the clutch block 23 for reciprocatory movement in a direction parallel with the axis of the crank shaft 7. The driven clutch pin 21 has a concave portion 24 (Figures 5, 7 and 9) for driven engagement with the driving clutch pins 20 and a slot 25 for receiving the clutch releasing member or knife 26. A brake drum 27 is mounted on the crank shaft 7 between the clutch block 23 and the adjacent bearing blocks 8. The brake drum 27 and clutch block 23 are fixed on the crank shaft 7 for rotation therewith by a key or spline 28. The driven clutch pin 21 is fixed against turning in its recess in the clutch block 23 by a key or spline 29.

A coil spring 30, positioned within the clutch pin 21 and engaging at its outer end against an adjacent part of the clutch block 23, operates when the knife 26 is released therefrom to force the pin 21 into the recess 19 in the flywheel 15. With the flywheel 15 rotating in a counterclockwise direction (Figure 5), one or the other of the driving clutch pins 20 engages the projecting end of the driven clutch pin 21 and drives the crank shaft 7 with the flywheel 15.

The back of the frame 1 has a shelf or platform 31 on which is mounted an electric motor 32. The motor 32 drives the flywheel 15, for example, by means of a V belt 33.

The knife or clutch releasing member 26 is pivoted at 34 on the frame 1. A lever 35 is positioned at generally right angles to the knife 26 and has an elongated slot 36 (Figure 5) by means of which it is pivoted and mounted for up and down movement at 37 on the frame 1. Where it crosses the knife 26 the lever 35 has an L-shaped slot 38, and a pin 39 on the knife 26 extends through this slot 38. The lower end of the lever 35 is connected by a rod or link 40 to a foot pedal 41 pivoted on the press, for example, on one of the tie rods 6 at the lower ends of the legs 5. A coiled spring 42 is connected between the lower end of the lever 35, at 43, and the knife or clutch releasing member 26, at 44, and operates to move the clutch releasing member 26 to clutch releasing position when it is freed of the lever 35, as will presently appear.

The inner end of the knife or clutch releasing member 26 is angular or tapered at 45 for engagement with the angular or tapered surface 46 of the slot 25 in the driven clutch pin 21 as it enters the slot 25. This forces the driven clutch pin 21 to the left (Figure 3) out of driving relation with respect to the driving clutch elements 20. The crank shaft 7 is then free of the rotating power member or flywheel 15.

A brake band 47 surrounds the brake drum 27 and has one end 48 passing through an eye or loop at the other end 49 and secured at 50 to the knife or clutch releasing member 26. Thus as the knife or clutch releasing member 26 swings clockwise about its pivot 34 (Figure 1) into the slot 25 to disengage the driven clutch element 21 from the driving clutch elements 20, the brake band 47 is tightened or applied against the brake drum 27 to arrest rotation of the crank shaft 7. As the knife or clutch releasing element 26 swings to released position to permit the driven clutch element 21 to move into engagement with the driving clutch elements 20, the brake band 47 is released.

For the purpose of tripping the device at the end of one revolution of the crank shaft 7 or other cycle of operation of the machine, the outer periphery of the clutch block 23 is provided with a tripping element 52. This tripping element 52 is shown in the form of a screw having its shank screwed into the periphery of the clutch block 23. The screw 52 is adjustable to impart any desired degree of movement to the lever 35 for freeing the clutch releasing member 26 from the lever 35, as will presently appear, and is secured in adjusted position, for example, by a jamb nut 53.

The operation is as follows:

With the parts positioned as shown in Figure 1 and the trip mechanism positioned as shown in Figure 5, the power member or fly-wheel 15 may rotate continuously without rotating the crank shaft 7. When it is desired to impart one revolution to the crank shaft 7 to operate the tool carried by the tool holder or ram 13, the foot pedal 41 is depressed. This depresses the lever 35 and, as a result, the knife or clutch releasing member 26 is swung downwardly to released position (Figure 7) by engagement of the pin 39 in the lower generally horizontal leg of the L-shaped slot 38. The spring 30 then moves the driven clutch pin 21 into driving relation with one of the driving clutch pins 20, and one of the pins 20 engages the concave surface 24 of the pin 21 and rotates the crank shaft 7 with the flywheel 15.

At the end of one revolution of the crank shaft 7 or other cycle of operation, the lever tripping element 52 on the clutch block 23 engages the lever 35 as shown in Figure 9, and swings the lever 35 clockwise about its pivot 37 to the position shown in Figure 9. This moves the generally vertical leg of the L-shaped slot 38 adjacent to the pin 39, thus freeing the knife 26 from the lever 35. The spring 42 then swings the knife 26 clockwise about its pivot 34 (Figure 9), and the angular or tapered end 45 of the knife 26 enters the slot 25 in the driven clutch pin 21 and, by cooperation with the tapered surface 46 of the slot 25, cams or forces the driven clutch pin 21 out of driving relation with respect to the driving clutch pins 20.

From the foregoing it will be apparent that the clutch releasing member 26 is automatically freed of the lever 35 and operates to release the clutch element regardless of whether the operator releases or fails to release the foot pedal 41. At the same time the clockwise movement of the knife 26 about its pivot 34 applies the brake which arrests rotation of the crank shaft 7 upon completion of one revolution or one cycle of operation.

When it is desired to impart another revolution or cycle of operation to the crank shaft 7, the foot pedal 41 is depressed. This releases the knife 26 from the driven clutch pin 21 which operates under the action of the pin 30 into driving relation with the driving clutch pins 20. At the same time this freeing of the driven clutch pin 21 for movement into driving relation with the driving clutch pins 20 releases the brake band 47. As a result the crank shaft is rotated with the flywheel 15 through the cooperating clutch elements, as previously described, and upon completion of one revolution or cycle of operation of the crank shaft 7, the device is again automatically tripped regardless of whether the operator releases or fails to release the foot pedal 41.

The embodiment of the invention shown in Figures 11, 12, and 13 is similar to the embodiment of the invention previously described, except that the lever 35', which corresponds to the lever 35 of the preceding embodiment of the invention, has a notch 55 in one edge for cooperation with the pin 39' instead of an L-shaped slot, as in the preceding embodiment of the invention. The operation, however, is the same, and the parts which are like the parts shown in Figures 5, 7 and 9 are designated by primed reference characters corresponding with the reference characters used in Figures 5, 7 and 9.

The embodiments of the invention shown in the drawings are for illustrative purposes only, and it is to be expressly understood that such drawings and the accompanying specification are not to be construed as a definition of the limits or scope of the invention, reference being had to the appended claims for that purpose.

I claim:

1. In mechanism of the class described, in combination, a driving member, a driven member, driving clutch means on said driving member, driven clutch means on said driven member, means urging said driven clutch means into engagement with said driving clutch means, a clutch releasing member operable to release said driven clutch means from said driving clutch means, a lever, a pedal connected to said lever to depress the same by depressing the pedal, cooperating means on said lever and said clutch releasing member for moving the clutch releasing member to released position and holding same in said position by depression of said pedal, a lever tripping member rotatable with the driven member and operable at the end of each cycle of operation of said driven member to move said lever to position in which the clutch releasing member is automatically freed of the lever and operates to release the driven clutch means from said driving clutch means regardless of whether the operator releases or fails to release the pedal, and brake means adapted to be applied to arrest movement of said driven member and to be released by movement of said clutch releasing member to released and clutching positions, said clutch releasing member and said lever being arranged at generally right angles to each other and the cooperating means on the lever and clutch releasing member comprising an L-shaped slot in the lever and a pin carried by said clutch releasing member and extending into said slot, the brake means comprising a brake band connected to said clutch releasing member and applied and released by movement of said clutch releasing member.

2. In mechanism of the class described, in combination, driving and driven members, cooperating clutch members, means for engaging one of said clutch members with the other clutch member, a pivoted clutch releasing arm having a clutch releasing portion for disengaging one of said clutch members from the other clutch member, a lever extending across said clutch releasing arm and mounted for pivotal and endwise movement, a pivoted manually operated lever connected to the lever which extends across said clutch releasing arm and operable to impart endwise movement to said last mentioned lever, a pin on said clutch releasing arm, a notch in the lever extending across said clutch releasing arm for engaging said pin to move the clutch releasing arm to position to permit engagement of said clutch members, a tripping member rotatable with said driven member and operable at each cycle of operation to swing the lever extending across said clutch releasing arm in a direction to free the notch in said last mentioned lever from the pin on said clutch releasing arm, and a spring connected to act to swing said clutch releasing arm to clutch releasing position when said notch is freed from said pin.

3. In mechanism of the class described, in combination, driving and driven members, cooperating cluch members, means for engaging one of said clutch members with the other clutch member, a pivoted clutch releasing arm having a clutch releasing portion for disengaging one of said clutch members from the other clutch member, a lever extending across said clutch releasing arm and mounted for pivotal and endwise movement, a pivoted manually operated lever connected to the lever which extends across said clutch releasing arm and operable to impart endwise movement to said last mentioned lever, a spring connected between said clutch releasing arm and the lever which extends across said arm, a pin on said clutch releasing arm, a notch in the lever extending across said clutch releasing arm for engaging said pin to move the clutch releasing arm to position to permit engagement of said clutch members, and a tripping member rotatable with said driven member and operable at each cycle of operation to swing the lever extending across said clutch releasing arm in a direction to free the notch in said last mentioned lever from the pin on said clutch releasing arm, said spring acting when the notch in the lever which extends across the clutch releasing arm is freed from the pin on said clutch releasing arm to swing said clutch releasing arm to clutch releasing position.

4. Mechanism according to claim 2 wherein the notch in the lever extending across the clutch releasing arm extends laterally from a slot disposed in said clutch releasing arm and elongated in the direction of endwise movement of said arm.

5. Mechanism according to claim 2 wherein the notch in the lever extending across the clutch releasing arm is disposed in one of the longitudinally extending edges of said arm.

6. Mechanism according to claim 2 wherein there is a brake band connected to said clutch releasing arm and applied and released by movement of said clutch releasing arm to arrest movement of said driven member and release said driven member for movement.

7. A safety trip mechanism comprising clutch means, a generally vertical lever mounted for pivotal and up-and-down movement, a pivoted clutch releasing arm extending generally horizontally across said lever, a pivoted manually operated lever, means connecting the lower end of said generally vertical lever to said manually operated lever, a pin on said clutch releasing arm, a notch in said generally vertical lever for engaging said pin to move the clutch releasing arm to position to permit engagement of said clutch means, a tripping member operable at each cycle of operation to swing said generally vertical lever in a direction to free the notch therein from the pin on said clutch releasing arm, and a spring connected to act to swing said clutch releasing arm to clutch releasing position when the notch in the generally vertical lever is freed from the pin on said clutch releasing arm.

8. A safety trip mechanism comprising clutch means, a generally vertical lever mounted for pivotal and up-and-down movement, a pivoted clutch releasing arm extending generally horizontally across said lever, a pivoted manually operated lever, means connecting the lower end of said generally vertical lever to said manually operated lever, a spring connected between the lower end of said generally vertical lever and said clutch releasing arm at position opposite the clutch releasing and thereof, a pin on said clutch releasing arm, a notch in said generally vertical lever for engaging said pin to move the clutch releasing arm to position to permit engagement of said clutch means, and a tripping member operable at each cycle of operation to swing said generally vertical lever in a direction to free the notch therein from the pin on said clutch releasing arm, said spring acting when the notch in the generally vertical lever is freed from the pin on said clutch releasing arm to swing said clutch releasing arm to clutch releasing position.

WILLIAM HEIM, Jr.

REFERENCES CITED

The following references are of record in the file of this patent:

UNITED STATES PATENTS

| Number | Name | Date |
| --- | --- | --- |
| 920,726 | Candee | May 4, 1909 |
| 1,133,344 | Walsh | Mar. 30, 1915 |
| 1,710,705 | Loshbough | Apr. 30, 1929 |
| 2,091,449 | Littell et al. | Aug. 31, 1937 |

FOREIGN PATENTS

| Number | Country | Date |
| --- | --- | --- |
| 12,501 | Switzerland | June 3, 1896 |

Certificate of Correction

Patent No. 2,492,284                                                December 27, 1949

WILLIAM HEIM, Jr.

It is hereby certified that error appears in the printed specification of the above numbered patent requiring correction as follows:

Column 8, line 24, for the words "releasing and" read *releasing end*;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*